United States Patent
Byun

(10) Patent No.: US 8,314,582 B2
(45) Date of Patent: Nov. 20, 2012

(54) METHOD OF CONTROLLING MOTOR IN IMAGE READING APPARATUS

(75) Inventor: Ji Young Byun, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 12/638,084

(22) Filed: Dec. 15, 2009

(65) Prior Publication Data

US 2010/0156328 A1 Jun. 24, 2010

(30) Foreign Application Priority Data

Dec. 24, 2008 (KR) .................. 10-2008-0133484

(51) Int. Cl.
*H02P 7/00* (2006.01)
(52) U.S. Cl. ........ 318/466; 318/128; 318/286; 318/460; 318/445; 318/135; 318/119
(58) Field of Classification Search .......... 358/411, 358/406; 324/172; 318/466, 128, 286, 460, 318/445
See application file for complete search history.

(56) References Cited

U.S. PATENT DOCUMENTS

| 4,247,461 | A | * | 1/1981 | Lin et al. | 540/318 |
| 5,126,545 | A | * | 6/1992 | Barkan | 235/462.25 |
| 5,198,909 | A | * | 3/1993 | Ogiwara et al. | 358/412 |
| 6,144,184 | A | * | 11/2000 | Yamaguchi | 318/696 |
| 6,538,407 | B2 | * | 3/2003 | Tanaka | 318/445 |
| 7,175,175 | B2 | * | 2/2007 | Okamoto et al. | 271/270 |
| 7,907,872 | B2 | * | 3/2011 | Komatsu et al. | 399/167 |
| 8,139,255 | B2 | * | 3/2012 | Matsunaga | 358/1.16 |

FOREIGN PATENT DOCUMENTS

JP 2004-357449 12/2004

OTHER PUBLICATIONS

English language abstract of JP 2004-357449, published Dec. 16, 2004.
Machine English language translation of JP 2004-357449; published Dec. 16, 2004.

* cited by examiner

*Primary Examiner* — Rita Leykin
(74) *Attorney, Agent, or Firm* — Stanzione & Kim, LLP

(57) ABSTRACT

Disclosed herein is a method of controlling a motor in an image reading apparatus. It may be possible to optimize the drive current of the motor for driving the movement of the scanning module by using information associated with, for example, the time it takes for the scanning module to return to a home or rest position after the scanning module is moved from the home position to a predetermined position. Such optimized drive current can result in improvements in the reading performance of an image by the image reading apparatus and reduction of power consumption.

20 Claims, 6 Drawing Sheets

METHOD OF CONTROLLING MOTOR IN IMAGE READING APPARATUS

CROSS-REFERENCE TO RELATED APPLICATION

This application claims the benefit of Korean Patent Application No. 2008-0133484, filed on Dec. 24, 2008 in the Korean Intellectual Property Office, the disclosure of which is incorporated herein by reference in its entirety.

TECHNICAL FIELD

Embodiments of the present disclosure generally relate to a method of controlling a motor in an image reading apparatus that optimizes drive current of the motor to move a scanning module.

BACKGROUND OF RELATED ART

Generally, an image reading apparatus, such as a digital copier, for example, can include a scanning module to read a document, a system control unit to temporarily store, edit, transmit, format, and/or convert an image of the document, and a printer unit to form, develop, and fuse the images associated with one or more documents or other image data on a printed medium. With the increase in the number of sheets processed per minute of the digital copier, high speed and high resolution of the scanning module are desirable. For example, when the digital copier is used as a copier, it may be required that the scanning module be more suitable for the high speed, and not high resolution. On the other hand, when the digital copier is used as a scanner, it may be required for the scanning module be more suitable for high resolution, and not high speed. That is, the scanning module of the digital copier may need to satisfy requirements related to both speed and quality, to a lager extend than the requirements that may be needed for a stand-alone scanner.

A step motor can be used to precisely drive and control the scanning module irrespective of, for example, an optical construction and a momentum transmission structure of an optical system. Step motors, however, have poor high speed properties when used to drive the scanning module of a copier requiring high speed operation. Moreover, not only during simple copying having a copy scaling of 100%, but also during enlargement copying or reduction copying having a copy scaling ranging from about 25% to about 400%, the step motor may be required to drive the scanning module at various speeds to read a document. When the scanning module is not properly controlled, vibration and noise can be generated, and an image of the scanned document can be distorted.

SUMMARY OF THE DISCLOSURE

In accordance with one aspect of the present disclosure, a method of controlling a motor that drives a movement of a scanning module in an image reading apparatus may be provided to include: adjusting a current supplied to the motor until the scanning module moves between a first position and a second position within a predetermined time; and when the scanning module between the first position and the second position within the predetermined time with an adjusted current being supplied to the motor, setting a drive current value of the motor for subsequent driving of the scanning module to a current value greater than or equal to the adjusted current.

The second position may be a home position of the scanning module. The first position may be an intermediate position between the home position and an end position. The home position and the end position may respectively be opposite ends of the range of the movement of the scanning module.

The predetermined time may be the time for the scanning module to reach the home position from the intermediate position.

The step of adjusting the current may comprise: increasing the current supplied to the motor to a level sufficient to move the scanning away from the home position; and further increasing the current supplied to the motor until the scanning module moves from the intermediate position to the home position within the predetermined time.

The step of increasing the current supplied to the motor to the level sufficient to move the scanning away from the home position may comprise: supplying the current at an initial level to the motor; sensing whether the scanning module is in the home position; and when it is sensed that the scanning module is in the home position, increasing the current supplied to the motor until the scanning module becomes offset from the home position.

The method may further comprise: after setting the drive current value, supplying the motor with the current at a level corresponding to the drive current value to thereby move the scanning module from the first position to the second position; when the scanning module reaches the second position from the first position within the predetermined time, decreasing the current supplied to the motor gradually by a delta value at a time until a low current level is reached, the scanning module not reaching the second position from the first position within the predetermined time when the motor is supplied the low current level; and setting the drive current value of the motor to a new current value that is greater than or equal to a sum of the low current level and the delta value.

According to another aspect of the present disclosure, a method of controlling a motor to drive a movement of a scanning module in an image reading apparatus may be provided to comprise: supplying the motor with a current at a level sufficient to move the scanning module from a first position to a second position; repeatedly decreasing the current supplied to the motor by a delta amount until a low current level is reached, the scanning module no longer reaching the second position from the first position within the predetermined time when the motor is supplied with the low current level; and setting a drive current value of the motor for subsequent driving of the scanning module to a current value greater than or equal to a sum of the low current level and the delta value.

The second position may be a home position of the scanning module. The first position may be an intermediate position between the home position and an end position. The home position and the end position may respectively be opposite ends of a range of the movement of the scanning module.

The predetermined time may be the time for the scanning module to reach the home position from the intermediate position.

According to yet another aspect of the present disclosure, a method of optimizing a drive current of a motor that drives a movement of a scanning module in an image reading apparatus may be provided to comprise: supplying a current to the motor for a first time duration such that the motor drives the scanning module to move in a first direction from a first position away from the first position; supplying the current in reverse polarity to the motor such that the motor drives the scanning module to move in a second direction opposite the first direction to thereby return to the first position; adjusting the current being supplied to the motor to obtain an adjusted current such that, when the adjusted current is supplied to the motor, a second time duration during which the scanning module moves in the second direction to return to the first position substantially equals a predetermined return time duration; and adopting as the drive current for the motor an optimized drive current that is greater than or equal to the adjusted current.

The method may further comprise determining whether the scanning module has returned to the first position within the predetermined return time duration. the step of adjusting the current may comprise increasing a magnitude of the current until the second time duration substantially equals the predetermined return time duration if the second time duration is longer than the predetermined return time duration.

The step of increasing the magnitude of the current may comprise repeatedly increasing the magnitude of the current by a predetermined amount at a time until an increase of the magnitude of the current by the predetermined amount causes the second time duration to change from being longer than the predetermined return time duration to be within the predetermined return time duration.

Alternatively, the step of adjusting the current may comprise decreasing the magnitude of the current until the second time duration substantially equals the predetermined return time duration if the second time duration is shorter than the predetermined return time duration.

The step of decreasing the magnitude of the current may comprise repeatedly decreasing the magnitude of the current by a predetermined amount at a time until a last decrease of the magnitude of the current by the predetermined amount causes the second time duration to change from being shorter than the predetermined return time duration to be longer than the predetermined return time duration. The adjusted current may be the current immediately prior to the last decrease of the magnitude of the current.

The method may further comprise storing information associated with the optimized drive current into a storage device.

The method may further comprise: determining whether the scanning module has moved away from the first position in the first direction; and increasing the current supplied to the motor to drive the scanning module to move in the first direction if it is determined that the scanning module has not moved away from the first position.

The method may further comprise: providing a sensor at a location adjacent the first position; and sensing with the sensor a presence of the scanning module at the first position.

The first position may be a home position for the scanning module, which may be one extreme end of the range of the movement of the scanning module.

The scanning module may move in the first direction to a second position that is an intermediate position between the home position and an end position. The end position may be the other extreme end opposite the home position of the range of the movement of the scanning module.

The optimized drive current may be greater than the adjusted current in magnitude by a predetermined margin.

BRIEF DESCRIPTION OF THE DRAWINGS

Various aspects of the disclosure will become apparent and more readily appreciated from the following description of several embodiments, taken in conjunction with the accompanying drawings, in which.

DETAILED DESCRIPTION OF SEVERAL EMBODIMENTS

Figure 1:
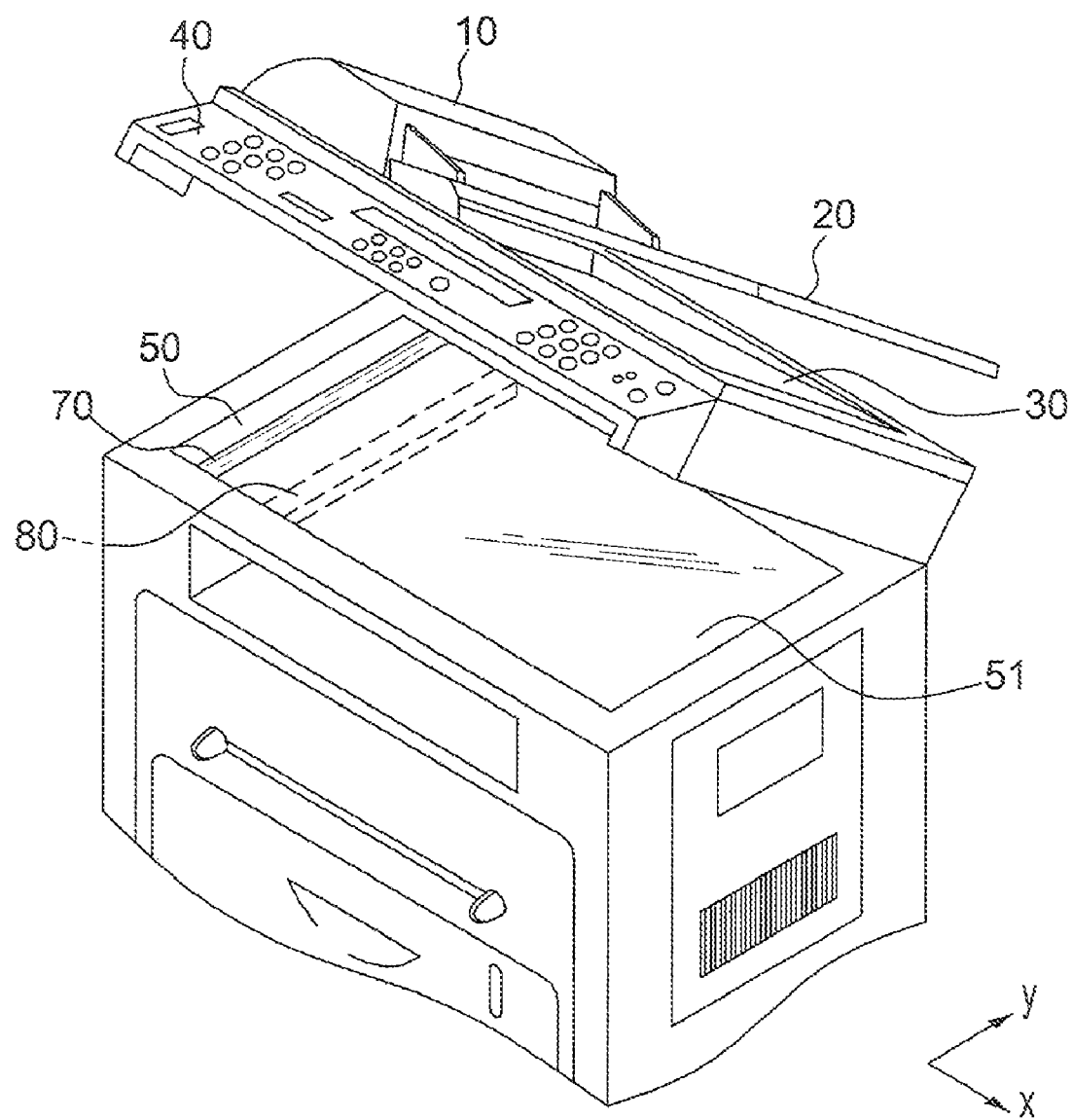
FIG. 1 is a perspective view illustrating an image reading apparatus according to an embodiment of the present disclosure.

Reference will now be made in detail to several embodiments of the present disclosure, examples of which are illustrated in the accompanying drawings, wherein like reference numerals refer to the like elements throughout.

FIG. 1 is a perspective view illustrating an image reading apparatus, according to an embodiment of the present disclosure. As shown in FIG. 1, the image reading apparatus can include flat glasses, such as a first flat glass 50 and a second flat glass 51, an automatic document feeder 10 and a scanning module 80. In FIG. 1, the x-axis direction indicates the vertical scanning direction in which the scanning module 80 moves to read an image while the y-axis direction indicates the horizontal scanning direction across which the scanning module 80, while being stationary, reads an image of a paper or a document at one time.

In one embodiment, the first flat glass 50 can be configured to contact a paper or document fed by an automatic document feeder (ADF) 10 and the second flat glass 51 can be configured to contact a stationary paper or document. The first flat glass 50 and the second flat glass 51 can be separate from each other. On a display panel 40 there can be displayed indications of the operation and/or the state of the image reading apparatus. Various kinds of manipulation keys can be disposed at the display panel 40. Paper loaded on a paper feeding tray 20 can be fed to the first flat glass 50 by the ADF 10. The scanning module 80 can be disposed at the rear or back portion of the first flat glass 50 and can be configured to read an image recorded on the paper. Once read by the scanning module 80, the paper can be discharged to a paper discharge tray 30. Between opposite ends of the first and second flat glasses 50 and 51 can be disposed a paper guide member 70, which can have an incline. The paper guide member 70 can be configured to guide the front end of the paper passing by the first flat glass 50 to the paper discharge tray 30. Paper that is to be fed one at a time, that is, paper that is not fed by the automatic document feeder 10, can be placed on the second flat glass 51.

At the rear or back portion of the second flat glass 51, the scanning module 80 can move in the scanning direction (i.e., in the positive x-axis direction) to read an image of the stationary paper. The initial position of the scanning module 80 can be, for example, at the rear of the first flat glass 50 when reading a paper fed by the automatic document feeder 10 and at the rear of the second flat glass 51 when reading a stationary paper.

Figure 2:
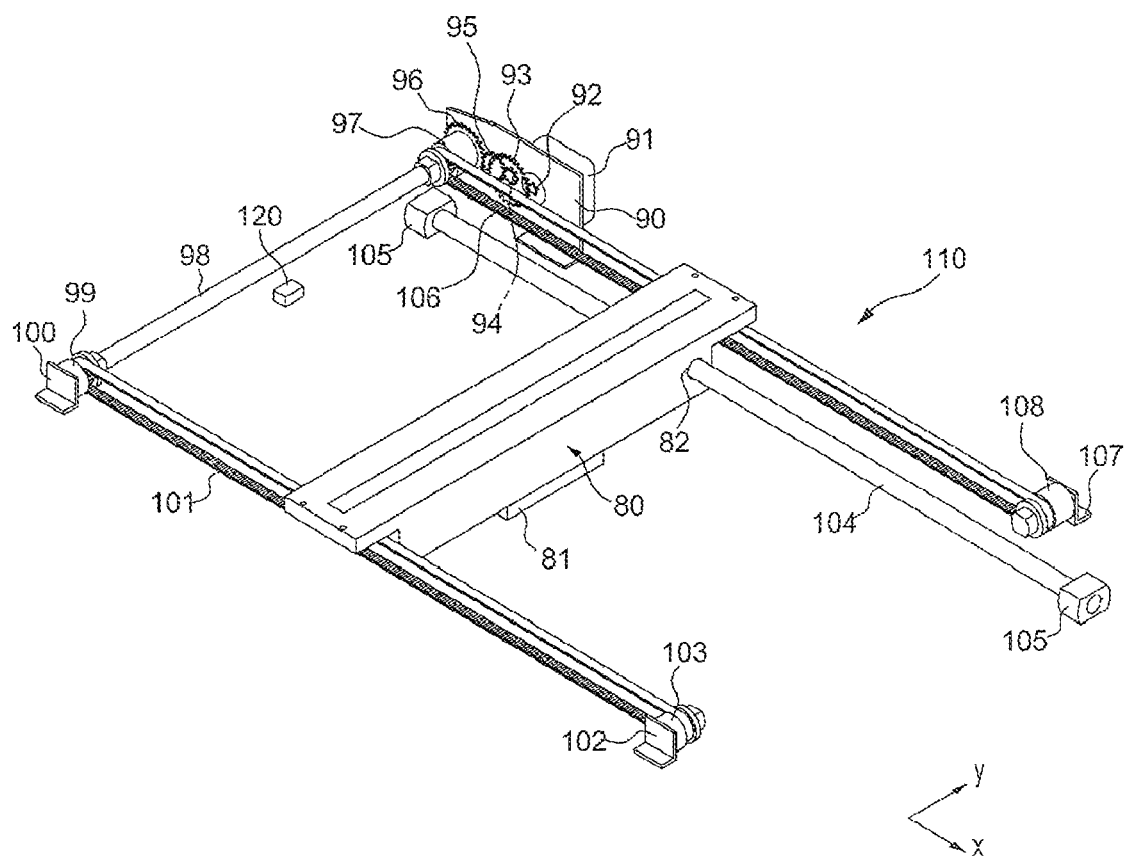
FIG. 2 is a perspective view illustrating a scanning module and a drive module according to the embodiment of the present disclosure usable in an image reading apparatus.

FIG. 2 is a perspective view illustrating the scanning module and a drive module according to the embodiment of the present disclosure. That is, the scanning module 80, which is configured to slide to read an image of paper P (not shown), and a drive module 110, which is configured to move the scanning module 80 in the vertical scanning direction along one axis, are shown in FIG. 2.

Like the construction of a general scanning module, the scanning module 80 can include a light source (not shown) configured to scan light to the paper P, a light reflection member (not shown) configured to concentrate the light emitted by the light source on the paper P, a lens unit (not shown) configured to condense and transmit an optical signal read from the paper P to an image sensor (not shown), multiple mirrors (not shown) configured to form an optical path from the light source to the lens unit, the image sensor configured to convert the optical signal condensed by the lens unit into an electric signal, and a frame forming an external ornament of the scanning module 80. The image sensor can include a charge coupled device (CCD) sensor, or a contact image sensor (CIS) sensor, or other like device, that is configured to sample or convert an optical signal obtained by scanning the paper P into an electric signal.

The drive module 110 can include a guide shaft 104 inserted in a guide hole 82 formed in the scanning module body 81. The guide hole 82 can be configured to allow the scanning module 80 to slide along the guide shaft 104 in the x-axis direction. Opposite ends of the guide shaft 104 can fixed to an apparatus body or other like component of the image reading apparatus by guide shaft holders 105.

The drive module 110 can further include a first timing belt 106 and a second timing belt 101 coupled to opposite ends of the scanning module 80, a first belt pulley 97 and a second belt pulley 99 each having teeth formed on the outer circumferences thereof to run the first and second timing belts 106 and 101, respectively, a connection shaft 98 configured to coaxially connect the first and second belt pulleys 97 and 99, a step motor 91 (e.g., a drive motor), and a drive force transmission member such as a gear train configured to connect the drive motor 91 and the first belt pulley 97. In the embodiment shown in FIG. 2, the gear train can include a first gear 92 coaxially coupled to the step motor 91, a second gear 93 connected to the first gear 92, a third gear 94, a fourth gear 95 and a fifth gear 96. In other embodiments, however, the gear train can include fewer or more gears than those shown in FIG. 2. The gear train can be configured, for example, to transmit a drive force received from the drive motor 91 to the first belt pulley 97 at a reduced rotational velocity suitable for driving the first belt pulley 97.

Teeth can be formed on the inner circumference of the first timing belt 106 so that the first belt pulley 97 can run the first timing belt 106, and on the inner circumference of the second timing belt 101 so that the second belt pulley 99 can run the second timing belt 101. As the size of the paper P increases, the volume, mass, and sliding velocity of the scanning module 80 may also increase, which may result in poor reading by the scanning module 80. Slippage between the first and second timing belts 106 and 101 and the belt pulleys 97 and 99, respectively, can be reduced when the first and second timing belts 106 and 101 are being driven by the engagement of the teeth therebetween. The first and second belt pulleys 97 and 99 can be coaxially connected to each other via the connection shaft 98, and therefore, the sliding velocities at the opposite ends of the scanning module 80 can be substantially the same.

Because the drive force is directly transferred to the scanning module 80 by the gear train, the belt pulleys 97 and 99, the timing belts 106 and 101, and the connection shaft 98, as shown in FIG. 2, slippage does not occur and the position and velocity of the scanning module 80 can be accurately controlled.

The drive module 110 can further include a first bracket 90 configured to couple the first belt pulley 97, the step motor 91, and the gear train to the apparatus body of the image reading apparatus and a second bracket 100 configured to couple the second belt pulley 99 to the apparatus body of the image reading apparatus.

At the opposite end of where the first belt pulley 97 is coupled to the first timing belt 106 can be disposed a third belt pulley 108 also coupled to the first timing belt 106. At the opposite end of where the second belt pulley 99 is coupled to the second timing belt 101 can be disposed a fourth belt pulley 103 also coupled to the second timing belt 101. Teeth can also be formed on the outer circumferences of the third and fourth belt pulleys 108 and 103. The third belt pulley 108 can be coupled to the apparatus body of the image reading apparatus by a third bracket 107. The fourth belt pulley 103 can be coupled to the apparatus body of the image reading apparatus by a fourth bracket 102.

A home sensor 120 can be configured to sense or detect the initial position, that is, a home position, of the scanning module 80. The home sensor 120 can be fixedly disposed at the home position of the scanning module 80. The home sensor 120 can sense a home position rib formed at the scanning module body 81 to confirm whether the scanning module 80 is located at the home position or has deviated from the home position, for example. The home sensor 120 can be implemented by using an optical sensor including a light emitting portion and a light receiving portion. In one embodiment, when the scanning module 80 is located at the home position, light emitted from the light emitting portion of the home sensor 120 cannot reach the light receiving part. When the scanning module 80 is offset from the home position, that is, moves either to the left or to right of the home position, the home position rib formed at the scanning module body 81 can be offset from the home sensor such that light emitted from the light emitting portion of the home sensor 120 can reach the light receiving portion. Consequently, it may be possible to confirm the relative position of the scanning module 80 based on an output signal generated by the home sensor 120.

Figure 3:
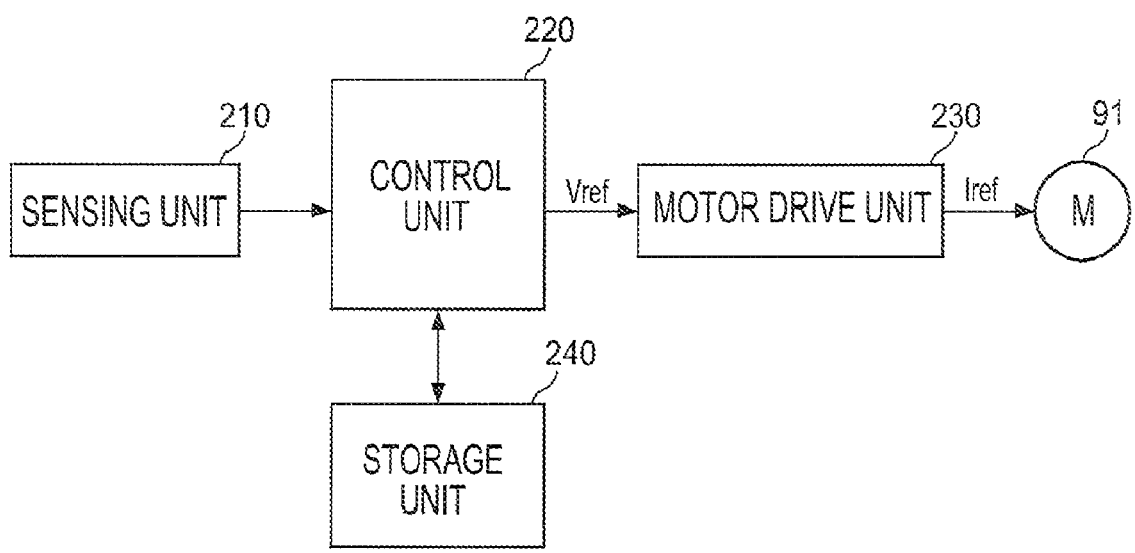
FIG. 3 is a control block diagram of the image reading apparatus according to an embodiment of the present disclosure.

FIG. 3 is a control block diagram of the image reading apparatus according to an embodiment of the present disclosure. As shown in FIG. 3, the image reading apparatus can include a sensing unit 210, a control unit 220, a motor drive unit 230 and a storage unit 240.

The sensing unit 210 can be configured to sense or detect whether the scanning module 80 has deviated from the initial position, that is, from the home position. The sensing unit 210 can include the home sensor 120.

The control unit 220 can be configured to output a control signal, such as a voltage Vref, for example, to the motor drive unit 230 to drive the step motor 91. In some embodiments, the control unit 220 can include hardware (e.g., analog circuitry, digital circuitry, processor, input/output interfaces, memory) and/or software (e.g., operating system, firmware, embedded code, applications) to produce the control signal. In particular, the control unit 220 can be configured to produce a control signal that results in a drive current Iref for the step motor 91. In some embodiments, the drive current Iref can be optimized to operate the step motor 91. Moreover, the control unit 220 can be configured to rotate the step motor 91 in the forward direction and in the reverse direction through the motor drive unit 230. While a detailed structure of the control unit 220 is not depicted in FIG. 3, as would be readily understood by those skilled in the art, the control unit 220 may be, e.g., a microprocessor, a microcontroller or the like, that includes a CPU to execute one or more computer instructions to implement the various control operations herein described and/or other control operations relating to the image reading apparatus, and to that end may further include a memory device, e.g., a Random Access Memory (RAM), Read-Only-Memory (ROM), a flesh memory, or the like, to store the one or more computer instructions.

The motor drive unit 230 can include a motor drive integrated circuit (IC). The motor drive unit 230 can be configured to generate a drive current Iref corresponding to the control signal Vref provided by the control unit 220 and to output the drive current Iref to the step motor 91. The step motor 91 can be configured to be driven by the drive current Iref. The motor drive unit 230 can be connected to, for example, a pulse width modulation (PWM) port of the control unit 220. For example, the voltage Vref to be supplied to the motor drive unit 230 can be changed by adjusting a PWM value provided by the control unit 220.

The storage unit 240 can be configured to store information associated with the drive current of the step motor 91, including optimization information. The storage unit 240 can also store various types of data that can be used to obtain the drive current of the step motor 91. The storage unit 240 can be configured to store analog data, or digital data, or both.

Figure 4:
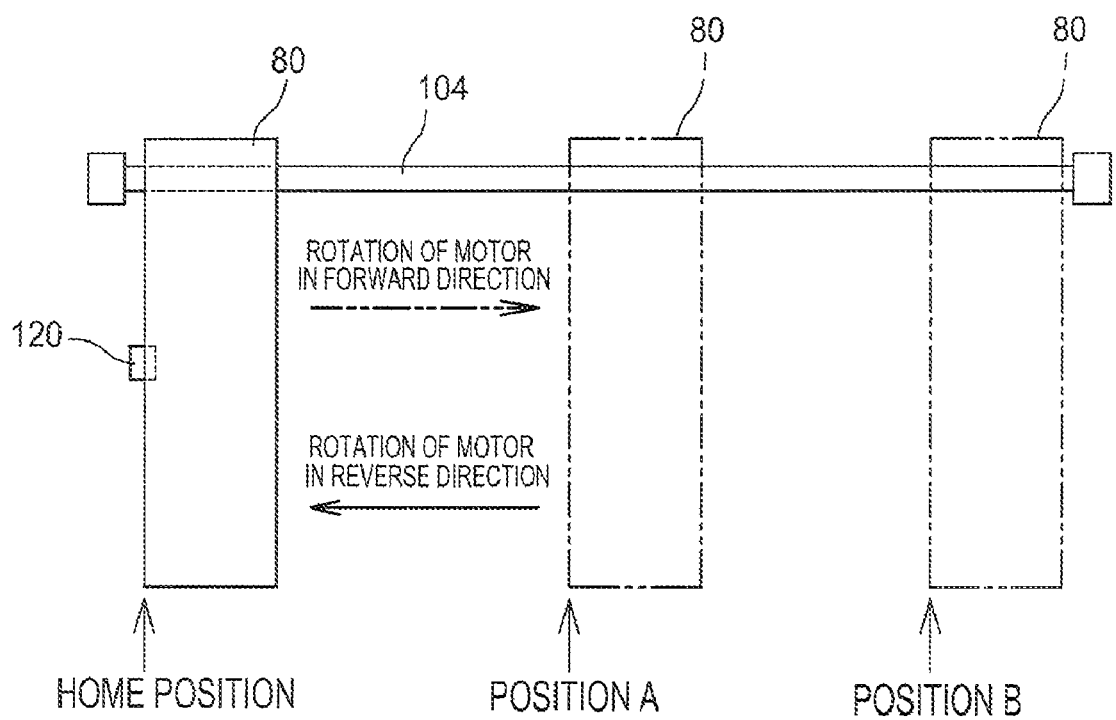
FIG. 4 is a view illustrating the scanning module moving from a home position to a predetermined position and returning to the home position in the image reading apparatus according to the embodiment of the present disclosure.

FIG. 4 is a view illustrating the scanning module moving from a home position to a predetermined position and returning to the home position in the image reading apparatus according to the embodiment of the present disclosure. In this example, when the step motor 91 rotates in the forward direction, the scanning module 80 moves from the left to the right of FIG. 4, and, when the step motor 91 rotates in the reverse direction, the scanning module 80 moves from the right to the left of FIG. 4.

To optimize the drive current that is applied to the step motor 91 to move the scanning module 80, the step motor 91 can be rotated first in the forward direction to move the scanning module 80 to a predetermined position, such as position A, as shown in FIG. 4.

After the scanning module 80 has been moved to position A, the step motor 91 can be rotated in the reverse direction to move the scanning module 80 back to the home position. During this procedure, the control unit 220 can obtain the voltage Vref that results in the best or the optimal drive current by increasing or decreasing the voltage Vref applied to the motor drive unit 230 by a predetermined voltage value delta based on the return time for which the scanning module 80 returns to the home position from position A. The value that is obtained by adjusting the voltage Vref may be the voltage that produces the best or optimal drive current for the step motor 91. Position B is an end or maximum position to which the scanning module 80 can move. During the optimization procedure, the scanning module 80 can be moved to position A, which is nearer to the home position than position B, and can then be returned to the home position. This way, the time needed to obtain the optimal drive current of the step motor 91 can be reduced.

Figure 5:
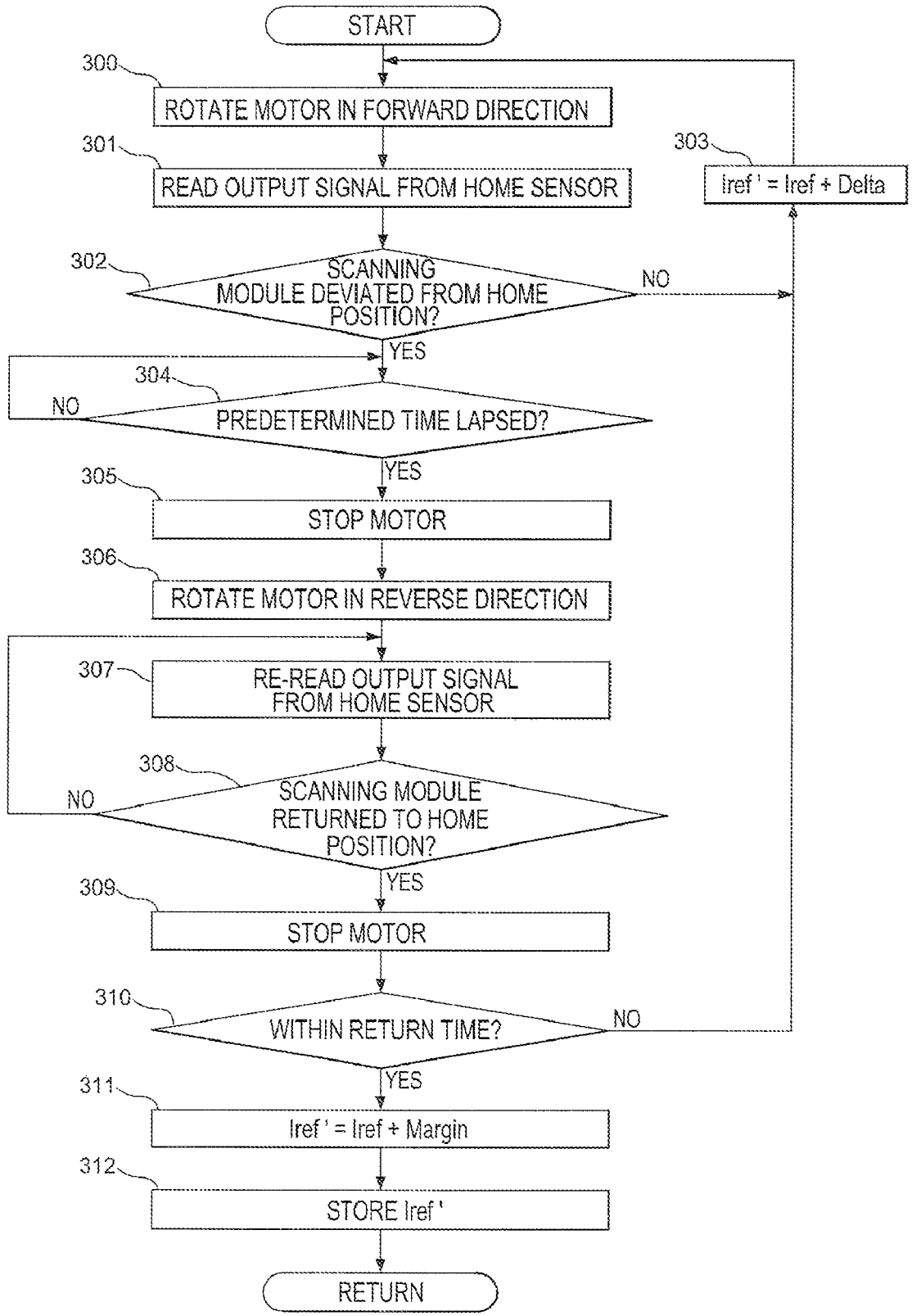
FIG. 5 is a control flow chart illustrating a method of increasing drive current of a step motor of the image reading apparatus above the present drive current to optimize the drive current, when torque of the step motor is less than normal torque, according to an embodiment of the present disclosure.

FIG. 5 is a control flow chart illustrating a method of increasing the drive current of the step motor of the image reading apparatus to optimize the drive current according to an embodiment of the present disclosure when the torque of the step motor is less than the normal operational torque.

Referring to FIG. 5 and to FIGS. 3 and 4, the control unit 220 can rotate the step motor 91 first in the forward direction to move the scanning module 80 from the home position to position A (300). The control unit 220 can control an initial current to be supplied to the step motor 91.

After scanning module 80 is moved through the rotation of the step motor 91 in the forward direction, the control unit 220 can read an output signal from the home sensor 120 (301).

Once the output signal from the home sensor 120 is read, the control unit 220 can determine whether the scanning module 80 has actually deviated from the home position (302). For example, when the output signal from the home sensor 120 is a HIGH signal, the control unit 220 can determines that the scanning module 80 has deviated from the home position. In this example, when the output signal from the home sensor 120 is a LOW signal, the control unit 220 can determine that the scanning module 80 is located at the home position.

When it is determined at 302 that the scanning module 80 has not deviated from the home position, the control unit 220 can set the drive current of the step motor 91 to a new drive current value Iref obtained by increasing the drive current Iref being applied to the step motor 91 by a predetermined current value delta (303). The control unit 200 can use the new drive current value Iref at 300 and on subsequent operations to be performed. The control unit 220 can increase the drive current applied to the step motor 91 by changing the voltage Vref produced by the motor drive unit 230 to a voltage value corresponding to the increased drive current value.

When it is determined at 302 that the scanning module 80 has moved and deviated from the home position, the control unit 220 can determine whether a predetermined time, that is, a time necessary for the scanning module 80 to move from the home position to reach the position A, has lapsed (304).

When the predetermined time has lapsed, with the result that the scanning module 80 has reached position A, the control unit 200 can control and stop the step motor 91 (305).

After the step motor 91 is stopped, the control unit 220 can control the step motor 91 to be rotated in the reverse direction (306). The control unit 200 can set the new drive current Iref to be supplied to the step motor 91.

After the rotation of the step motor 91 in the reverse direction, the control unit 220 can read an output signal from the home sensor 120 (307).

After the reading of the output signal from the home sensor 120, the control unit 220 can determine whether the scanning module 80 has returned to the home position (308). For example, when the output signal from the home sensor 120 is a HIGH signal, the control unit 220 can determine that the scanning module 80 has not returned to the home position. In this example, when the output signal from the home sensor 120 is a LOW signal, the control unit 220 can determine that the scanning module 80 has returned to the home position.

When it is determined at 308 that the scanning module 80 has not returned to the home position, the procedure returns to 307, where the control unit 220 can control the operations at 307 and subsequent operations to be performed.

Returning to 308, when it is determined that the scanning module 80 has returned to the home position, the control unit 220 can control and stop the step motor 91 (309), and can determine whether the scanning module 80 has returned to the home position within a predetermined return time (310). When it is determined that the scanning module 80 has not returned to the home position within the predetermined return time, the procedure returns to 303 where the control unit 220 can set the drive current of the step motor 91 to a new drive current value Iref obtained by increasing the drive current Iref being applied to the step motor 91 by the predetermined current value delta (303).

Returning to 310, when it is determined that the scanning module 80 has returned to the home position within the predetermined return time, the control unit 220 can set the drive current of the step motor 91 to a new drive current value Iref obtained by increasing the drive current Iref being applied to the step motor 91 by a predetermined margin (311), and can store information associated with the new drive current Iref of the step motor 91 in the storage unit 240 (312). Subsequently, the procedure can return to a predetermined routine.

Figure 6:
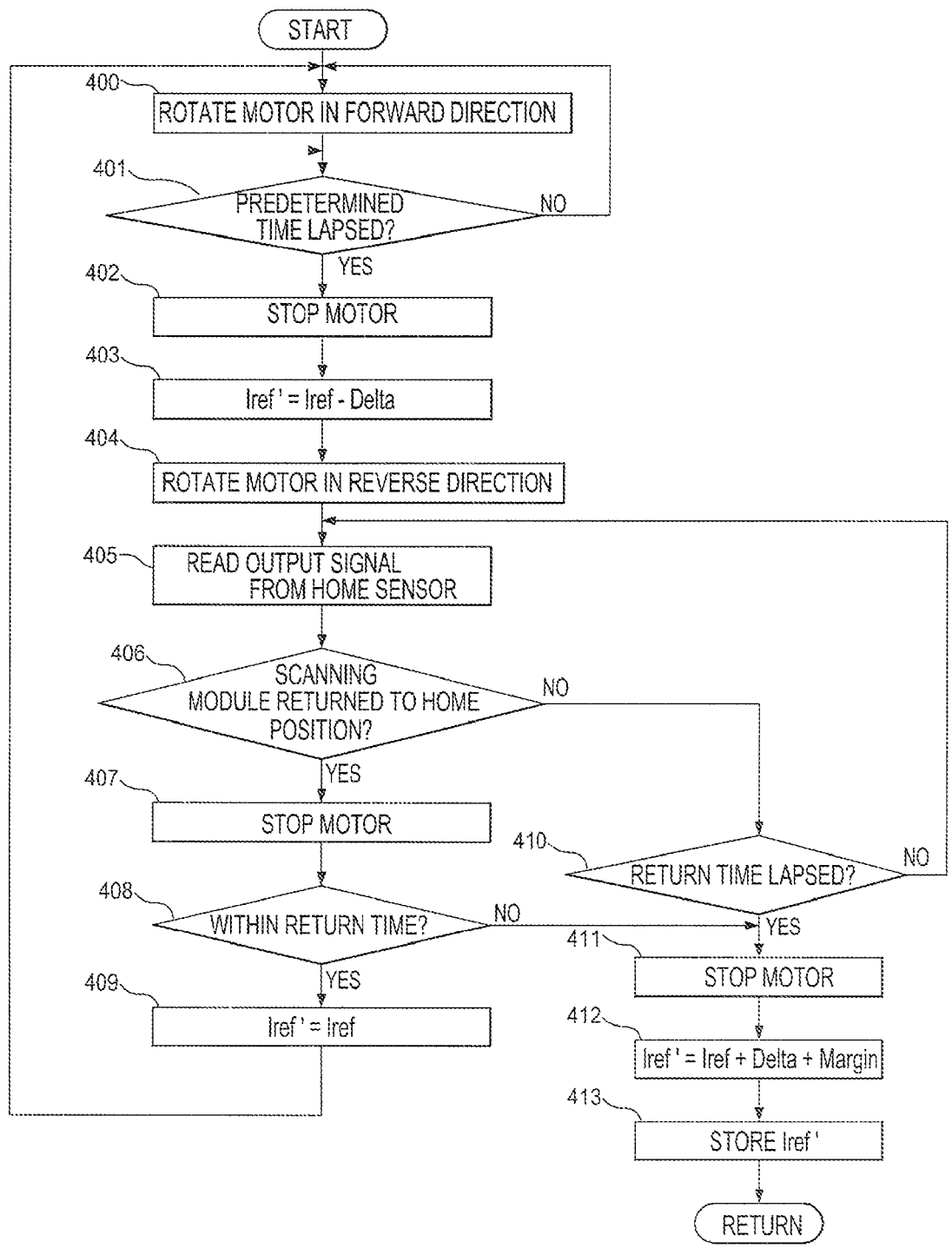
FIG. 6 is a control flow chart illustrating a method of decreasing drive current of the step motor of the image reading apparatus below the present drive current to optimize the drive current, when torque of the step motor is greater than normal torque, according to another embodiment of the present disclosure.

FIG. 6 is a control flow chart illustrating a method of decreasing the drive current of the step motor of the image reading apparatus to optimize the drive current when the torque of the step motor is greater than normal operational torque according to another embodiment of the present disclosure.

Referring to FIG. 6 and to FIGS. 3 and 4, the control unit 220 can rotate the step motor 91 first in the forward direction to move the scanning module 80 from the home position to the position A (400).

After the rotation of the step motor 91 in the forward direction, the control unit 220 can determine whether a predetermined time, that is, a time necessary for the scanning module 80 to move from the home position and reach position A, has lapsed (401).

When the predetermined time has lapsed such that the scanning module 80 has reached position A, the control unit 200 can control and stop the step motor 91 (402).

After the step motor 91 is stopped, the control unit 220 can set the drive current of the step motor 91 to a new drive current value Iref obtained by decreasing the drive current Iref being applied to the step motor 91 by a predetermined current value delta (403).

After the drive current of the step motor 91 is set to the new drive current value Iref, the control unit 220 can cause the new drive current Iref to be supplied to the step motor 91 such that the step motor 91 is rotated in the reverse direction (404).

After the step motor 91 is rotated in the reverse direction, the control unit 220 can read the output signal from the home sensor 120 (405).

After reading the output signal from the home sensor 120, the control unit 220 can determine whether the scanning module 80 has returned to the home position (406). For example, when the output signal from the home sensor 120 is a HIGH signal, the control unit 220 can determine that the scanning module 80 has not returned to the home position. In this example, when the output signal from the home sensor 120 is a LOW signal, the control unit 220 can determine that the scanning module 80 has returned to the home position.

When it is determined at 406 that the scanning module 80 has returned to the home position, the control unit 220 can control and stop the step motor 91 (407), and can determine whether the scanning module 80 has returned to the home position within a predetermined return time (408). When it is determined that the scanning module 80 has returned to the home position within the predetermined return time, the control unit 220 can set the drive current Iref being applied to the step motor 91 to the new drive current value Iref (409), and can control the subsequent operations to be performed by the scanning module 80.

Returning to 406, when it is determined that the scanning module 80 has not returned to the home position, the control unit 220 can determine whether the return time has lapsed (410). When it is determined that the return time has not lapsed, the procedure can return to 405, where the control unit 220 can control the operations at 405 and subsequent operations to be performed. Returning to 410, when it is determined that the return time has lapsed before the scanning module 80 returns to the home position or that the scanning module 80 has returned to the home position after the lapse of the return time (408), the control unit 220 can control and stop the step motor 91 (411).

After the step motor 91 is stopped, the control unit 220 can set the drive current of the step motor 91 to a new drive current value Iref obtained by increasing the drive current Iref being applied to the step motor 91 by a predetermined current value delta and by a predetermined margin (412). That is, the current value obtained by adding the predetermined margin value to the drive current at the last point of time when the scanning module 80 has returned to the home position within the return time is set to the new drive current.

Subsequently, the control unit 220 can store information associated with the new drive current Iref of the step motor 91 in the storage unit 240 (413), and the procedure can return to a predetermined routine.

As described above, FIG. 5 illustrates a method of increasing the drive current of the step motor above the then current drive current to optimize the drive current when the torque of the step motor is less than the normal operational torque according to an embodiment while FIG. 6 illustrates a method of decreasing the drive current of the step motor below the then current drive current to optimize the drive current when the torque of the step motor is greater than the normal operational torque.

The above-described two methods can be performed independently or together. When performed together, the methods can be performed in any sequence or order. Moreover, the optimization of the step motor 91 can be performed when the image reading apparatus is first turned on or at some other predetermined time.

As is apparent from the above description, it may be possible to optimize the drive current of the motor to move the scanning module using time for which the scanning module returns to the home position after the scanning module is moved from the home position to a predetermined position, thereby reducing vibration and noise generated during the movement of the scanning module and thus improving the reading quality of an image, and, in addition, achieving normal operation of the motor within a short time even when the motor malfunctions.

Also, it may be possible to optimize the drive current of the motor to move the scanning module using the time it takes for the scanning module to return to the home position after the scanning module is moved from the home position to a predetermined position, thereby preventing excessive drive current from being supplied to the motor and thus reducing unnecessary power consumption.

Although several embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of controlling a motor that drives a movement of a scanning module in an image reading apparatus, comprising:

increasing a current by a predetermined value supplied to the motor until the scanning module moves between a first position and a second position within a predetermined time; and when the scanning module between the first position and the second position within the predetermined time with an increased current being supplied to the motor, setting a drive current value of the motor for subsequent driving of the scanning module to a current value greater than or equal to the increased current.

2. The method according to claim 1, wherein the second position is a home position of the scanning module, and the first position is an intermediate position between the home position and an end position, the home position and the end position being respectively opposite ends of a range of the movement of the scanning module.

3. The method according to claim 2, wherein the predetermined time is a time for the scanning module to reach the home position from the intermediate position.

4. The method according to claim 3, wherein the step of adjusting the current comprises:
increasing the current supplied to the motor to a level sufficient to move the scanning away from the home position; and
further increasing the current supplied to the motor until the scanning module moves from the intermediate position to the home position within the predetermined time.

5. The method according to claim 4, wherein the step of increasing the current supplied to the motor to the level sufficient to move the scanning away from the home position comprises:
supplying the current at an initial level to the motor;
sensing whether the scanning module is in the home position; and
when it is sensed that the scanning module is in the home position, increasing the current supplied to the motor until the scanning module becomes offset from the home position.

6. The method according to claim 1, further comprising:
after setting the drive current value, supplying the motor with the current at a level corresponding to the drive current value to thereby move the scanning module from the first position to the second position;
when the scanning module reaches the second position from the first position within the predetermined time, decreasing the current supplied to the motor gradually by a delta value at a time until a low current level is reached, the scanning module not reaching the second position from the first position within the predetermined time when the motor is supplied the low current level; and
setting the drive current value of the motor to a new current value that is greater than or equal to a sum of the low current level and the delta value.

7. A method of controlling a motor to drive a movement of a scanning module in an image reading apparatus, comprising:
supplying the motor with a current at a predetermined level sufficient to move the scanning module from a first position to a second position;
repeatedly decreasing the current supplied to the motor by a delta amount until a low current level is reached, the scanning module no longer reaching the second position from the first position within the predetermined time when the motor is supplied with the low current level; and
setting a drive current value of the motor for subsequent driving of the scanning module to a current value greater than or equal to a sum of the low current level and the delta value.

8. The method according to claim 7, wherein the second position is a home position of the scanning module, and the first position is an intermediate position between the home position and an end position, the home position and the end position respectively being opposite ends of a range of the movement of the scanning module.

9. The method according to claim 8, wherein the predetermined time is a time for the scanning module to reach the home position from the intermediate position.

10. A method of optimizing a drive current of a motor that drives a movement of a scanning module in an image reading apparatus, comprising:
supplying a current to the motor for a first time duration such that the motor drives the scanning module to move in a first direction from a first position away from the first position;
supplying the current in reverse polarity to the motor such that the motor drives the scanning module to move in a second direction opposite the first direction to thereby return to the first position;
adjusting the current being supplied to the motor to obtain an adjusted current such that, when the adjusted current is supplied to the motor, a second time duration during which the scanning module moves in the second direction to return to the first position substantially equals a predetermined return time duration; and
adopting as the drive current for the motor an optimized drive current that is greater than or equal to the adjusted current.

11. The method of claim 10, further comprising:
determining whether the scanning module has returned to the first position within the predetermined return time duration,
wherein the step of adjusting the current comprises:
increasing a magnitude of the current until the second time duration substantially equals the predetermined return time duration if the second time duration is longer than the predetermined return time duration.

12. The method of claim 11, wherein the step of increasing the magnitude of the current comprises:
repeatedly increasing the magnitude of the current by a predetermined amount at a time until an increase of the magnitude of the current by the predetermined amount causes the second time duration to change from being longer than the predetermined return time duration to be within the predetermined return time duration.

13. The method of claim 10, further comprising:
determining whether the scanning module has returned to the home position within the predetermined return time duration,
wherein the step of adjusting the current comprises:
decreasing the magnitude of the current until the second time duration substantially equals the predetermined return time duration if the second time duration is shorter than the predetermined return time duration.

14. The method of claim 13, wherein the step of decreasing the magnitude of the current comprises:
repeatedly decreasing the magnitude of the current by a predetermined amount at a time until a last decrease of the magnitude of the current by the predetermined amount causes the second time duration to change from being shorter than the predetermined return time duration to be longer than the predetermined return time duration,
wherein the adjusted current is the current immediately prior to the last decrease of the magnitude of the current.

15. The method of claim 10, further comprising:
storing information associated with the optimized drive current into a storage device.

16. The method of claim 10, further comprising:
determining whether the scanning module has moved away from the first position in the first direction; and
increasing the current supplied to the motor to drive the scanning module to move in the first direction if it is determined that the scanning module has not moved away from the first position.

17. The method of claim 10, further comprising:
providing a sensor at a location adjacent the first position; and
sensing with the sensor a presence of the scanning module at the first position.

18. The method of claim 17, wherein the first position is a home position for the scanning module, the home position being a first extreme end of a range of the movement of the scanning module.

19. The method of claim 18, wherein the scanning module moves in the first direction to a second position that is an intermediate position between the home position and an end position, the end position being a second extreme end opposite the first extreme end of the range of the movement of the scanning module.

20. The method of claim 10, wherein the optimized drive current is greater than the adjusted current in magnitude by a predetermined margin.

* * * * *